United States Patent

[11] 3,588,203

[72] Inventor Joseph W. Purman
 Milwaukee, Wis.
[21] Appl. No. 857,349
[22] Filed Sept. 12, 1969
[45] Patented June 28, 1971
[73] Assignee The Louis Allis Company

[54] SELF-EQUALIZING, SELF-ALIGNING THRUST BEARING
 10 Claims, 4 Drawing Figs.
[52] U.S. Cl. .................................................. 308/160
[51] Int. Cl. .................................................. F16c 17/06
[50] Field of Search .......................................... 308/160, 168, 73

[56] References Cited
 UNITED STATES PATENTS
 2,871,070 1/1959 Dunn ........................... 308/160

Primary Examiner—Fred C. Mattern, Jr.
Assistant Examiner—Frank Susko
Attorneys—Alfred B. Levine, Alan C. Rose and Daniel D. Fetterley ABSTRACT: A thrust bearing in which two sets of balls, one set free to move in an annular race and a second set supported by the first set and acting as pivots for the bearing pads, act in consort to transmit and balance movement of the pads. The bearing is improved by the use of a retaining ring to keep the first set of balls within the race thereby permitting several balls of the first set to lie between consecutive balls of the second set. The ring has holes therein to locate the balls of the second set. The bearing is further improved by the use of offset ring holes or offset pad spacers to provide offcenter pivoting of the pads.

SHEET 2 OF 3
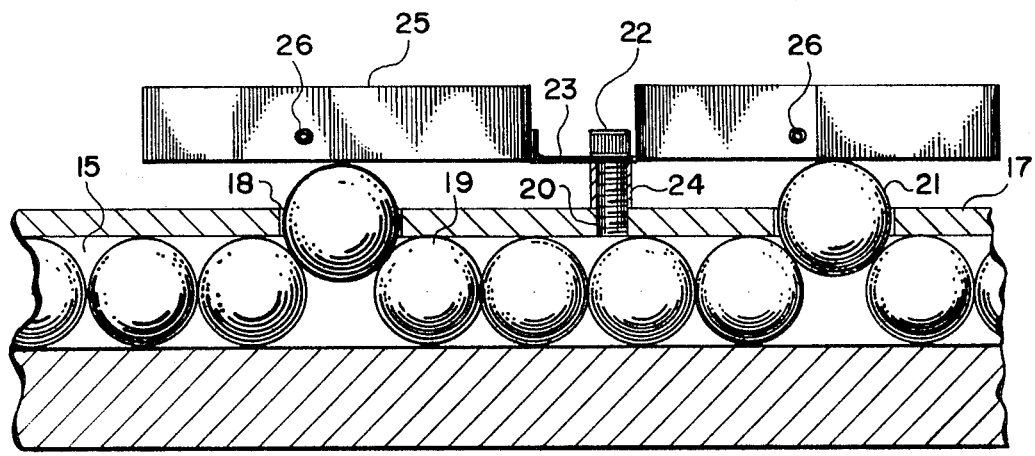
FIG. 2
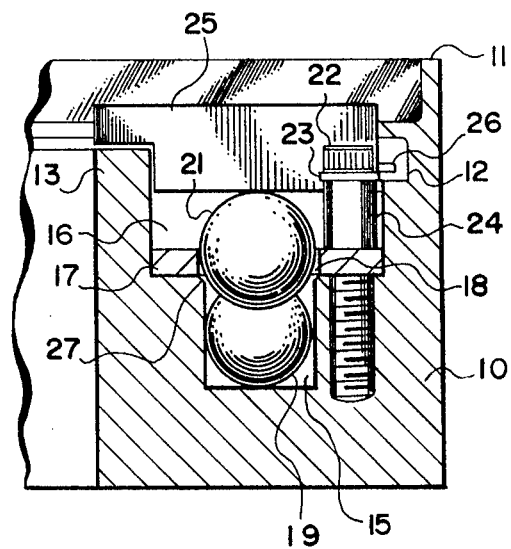
FIG. 3
*INVENTOR.*
JOSEPH W. PURMAN
BY 

3,588,203

SELF-EQUALIZING, SELF-ALIGNING THRUST BEARING

FIELD OF THE INVENTION

The present invention relates to thrust bearings. More particularly, it relates to thrust bearings in which the bearing pads are self-equalizing and self-aligning through the use of coacting ball pivots and a ball transmission.

HISTORY OF THE ART

In a thrust bearing which must support the entire weight of a machine such as an electric motor, equal pressure on each of the individual bearing pads is essential for optimum performance and long wear. To achieve equal pressure on each of the bearing pads, it is necessary that each pad be free to adapt to the angle and irregularities of the rotating runner. Many solutions to achieve self-equalizing and self-aligning bearing pads are disclosed in the prior art. Of these various systems, the type which relies on balls to pivot the pads and to transmit movement between the various pads for balancing are considered to be the most practical. This type of bearing structure is described in U.S. Pat. No. 1,354,949 issued to Eric Brown Oct. 5, 1920 and U.S. Pat. No. 2,871,070 issued to Eustace Dunn Jan. 27, 1959. These two patents are examples of thrust bearings in which a ball type pivot coacts with balls movable in an annular race to transmit movement of the thrust bearing pads to equalize bearing pad position.

The problem that is common to both the structure shown by Dunn and that shown by Brown is that for each upper ball or rounded pivot (Dunn) a corresponding ball in the race is required. Thus, for fewer number of pads requiring fewer number of balls, larger balls top and bottom will be required. Since it is often desirable to use a fewer number of bearing pads to achieve a more compact bearing, the larger size of the balls is undesirable.

Accordingly, it is an object of the present invention to provide a thrust bearing using balls to pivot the thrust pads and to transmit movement between pads in which the number, size and positioning of the balls are controllable.

By use of a retaining ring to hold the balls in the race, the advantages of selectable ball number, ball size and positioning are realized. It is thought that the primary reason for having equal numbers of balls in the race and above the race is to prevent the balls in the race from popping up during the transmission of movement. This requirement of equal ball number can be done away with if a retaining ring is secured to the housing above the race so that the balls in the race are retained therein. The retaining ring may then have holes spaced therein to permit the upper pivot balls to come into contact with the lower movement transmitting balls. The retaining ring allows a plurality of balls to lie in the race between pivot balls and it is readily seen that this plurality can change in number in accordance with the number of pivot balls required to support the bearing pads and the size of the balls in the race. The retaining ring not only retains the lower balls in the race, but also accurately positions the pivot balls.

In an alternate embodiment the race opens to the bottom of the housing for insertion of race balls and the housing itself acts to restrain the balls. Holes in the housing surface above the race permit the bearing balls to be inserted beneath the bearing pads to rest on the race balls.

In addition to self-equalization (the different thickness or unevenness of the bearing pads is compensated for by the seesaw action between pads via the two ball set linkage) and self-alignment (pads are independently pivoted and free to conform to the angle of the runner), the advantage of having the bearing operate most efficiently for various types of lubricants is desired. To this end, it has been recognized that the bearing pads can be provided with a preset tilt in the direction of rotation, the angle of the tilt differing for different viscosity lubricants to provide optimum pad lubricant gathering with movement of the runner.

The retaining ring over the race aids in providing a preset tilt to the pads in one embodiment of the invention. This is readily achieved by merely having the holes in the retaining ring offset from the center of the pads. The retaining ring can then be inverted to provide reverse angle tilt to the pads for reverse rotation of the runner. In another embodiment for providing preset tilt to the pads, the bolts which secure the retaining ring to the bearing housing are provided with offset washers which push against the adjacent pad so that the pivot becomes an off center pivot. Because the bolts are located symmetrically between adjacent pads, the washer can be used to push in either direction against either of the adjacent pads to provide the tilt desired for either direction of rotation.

BRIEF DESCRIPTION OF THE DRAWINGS

The objects and advantages of the invention will be better understood from a detailed description of an exemplary embodiment as shown in the drawings, in which:

FIG. 2 is a side view of a segment of the bearing with the housing removed;

FIG. 3 is an end view of the bearing looking along the race; and

DETAILED DESCRIPTION

Figure 1:
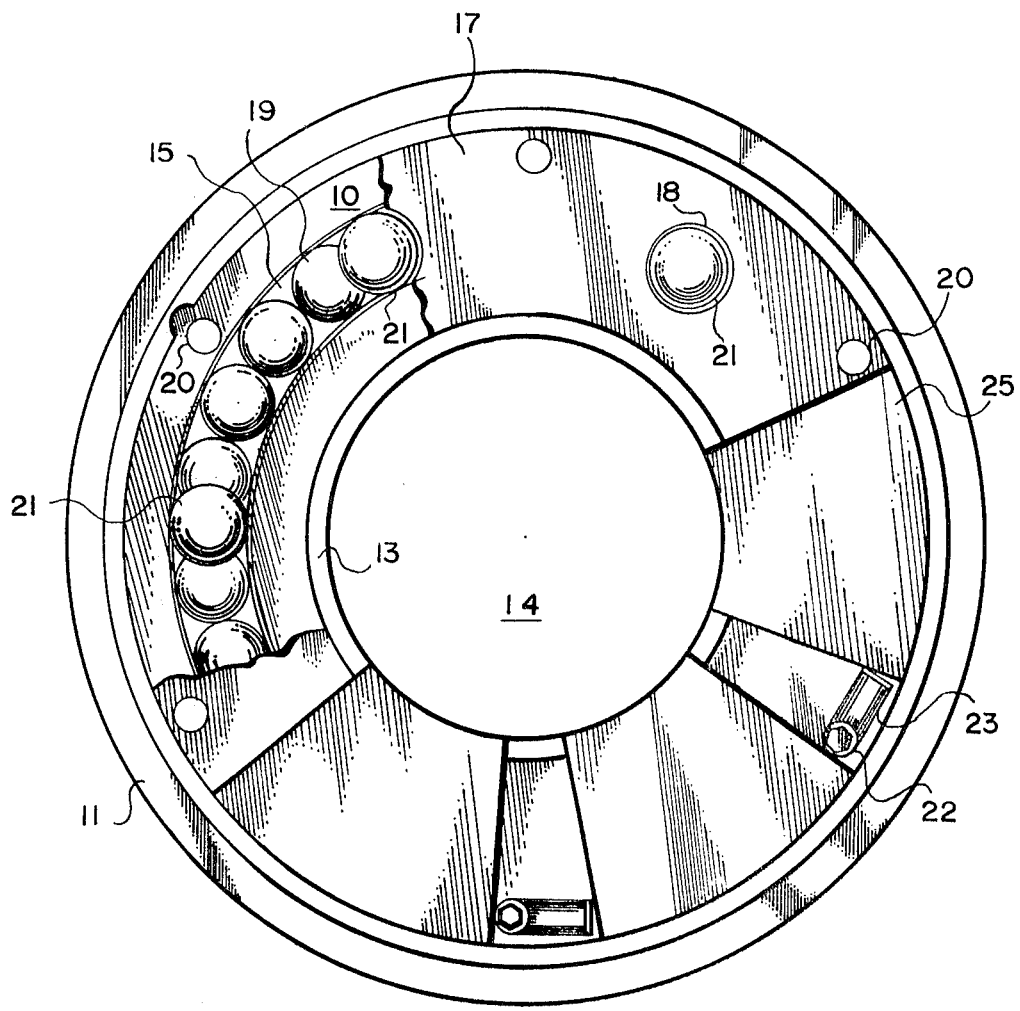
FIG. 1 is a plan view of a thrust bearing in accordance with the principles of the invention showing portions thereof cut away.

Referring now to the drawings, there is shown in FIGS. 1, 2 and 3 a thrust bearing having a housing 10 with outer sidewall 11 and inner sidewall 13 about an opening 14 for receiving the shaft of the machine being supported. FIG. 3 best shows that the space between the inner and outer walls is recessed, the area generally being indicated as 16. Midway between the inner and outer walls there is a race 15 for the receipt of a first set of balls 19. FIG. 3 shows that the outer wall 11 of the housing is recessed at 12 to receive the pin 26 of the bearing pad 25 to movably secure the bearing pad to the housing.

The race 15 is shown to be directly below and at the radial center of the bearing pads 25. This race contains a set of balls 19 which provide movement communication between the pads through their pivot balls 21. As is best seen in FIG. 2, the first set of balls 19 are loosely positioned in the race and the spaces between groups of balls are taken up by the pivot balls 21.

FIG. 2 shows that the downward thrust of the balls 21 onto the balls 19 would occasion an eruption of these balls were it not for some means to restrain the balls 19 within the race. Accordingly, there is provided a retaining ring 17 to retain the balls 19 in the race thereby permitting a plurality of balls 19 to lie between the pivot balls 21. Ring 17 is secured to the housing by bolts 22 through the bolt holes 20. Bolt holes 20 are preferably placed equidistant from the pivot ball positioning holes 18 in the ring.

The retaining ring provides several desirable features. As mentioned, it restrains the balls 19 from leaving the race. Holes 18 therein position the pivot balls so that they are evenly annularly spaced, one for each bearing pad, the holes either being positioned in line with the centers of the pads or offset therefrom so that the pivot balls tilt the bearing pads in the direction desired for the rotation of the runner (not shown) which rests on the bearing pads. With holes in an offset relationship to the center of the pads, the direction of tilt can readily be changed by turning the retaining ring upside down. It is noted that the holes 18 are large enough to permit the pivot balls to rest against and be supported by the balls 19.

FIGS. 2 and 3 illustrate the larger size of the balls 21 than the balls 19. This is preferred, although not essential, so that the balls 21 do not fall down into the race when being inserted. The holes in the retaining ring are sufficiently large to permit manual insertion and retrieval of the balls from the holes. FIG.

3 shows that the race 15 is chamfered at the top edge 27 so that the balls 21 do not bind on the normally square upper edges of the race.

The bearing pads 25 are shown to be somewhat pie shaped extending from the inner to the outer walls of the housing. A pin 26 is secured in the center of the outer edge of each pad to be received by the groove 12 in the outer wall 11 of the housing 10. This pin 26 and the close tolerance of the pad to the inner wall of the housing prevents the pad from being lifted out of the housing.

The bolts 22 which secure the retaining ring to the housing also serve with the aid of a washer 23 to position the pads and prevent them from moving laterally. FIG. 1 shows that the washers 23 may be of an offset type which provides the tilt to the pads for optimum utilization of a lubricant for a given direction of runner rotation. The offset washer can be moved from the right-hand side of the bolt as shown to the left-hand side to accommodate counterclockwise rotation. As shown in FIG. 1, the direction of rotation is clockwise and the pads tilt up from right to left.

It is noted that two alternative schemes for pad tilting have been described. The two schemes are mutually exclusive. Thus, when an offset washer scheme is employed to provide tilting, the holes 18 in the ring, in the absence of the adjustment caused by the washers, align with the center of the pads.

FIGS. 2 and 3 show that the securing bolts 22 are provided with a spacing washer 24 in addition to the positioning washer 23 to provide elevation for the positioning washer 23 above the retaining ring. FIG. 3 also shows that the housing is threaded to receive bolt 22.

Figure 4:
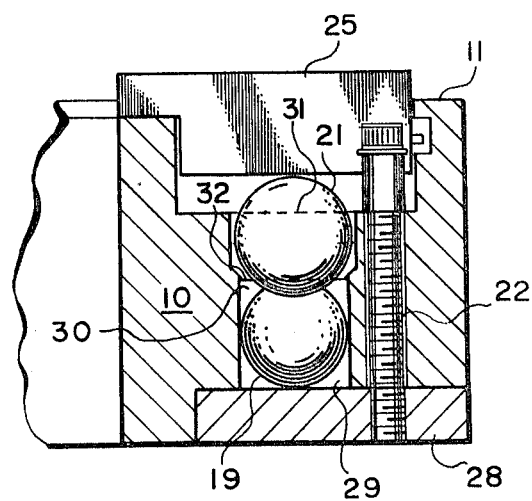
FIG. 4 is an end view of an alternative embodiment of the invention.

An alternate solution to race ball retention and pivot ball positioning is shown in FIG. 4. Here there is no retaining ring. Instead, the housing 10 is hollowed out to form a race 29. The race 29 may be completely open at the bottom for insertion of balls 19 and then enclosed by bottom plate or retaining ring 28 which can be held in place by bolts 22. Dashed lines 31 and 32 show that housing 10 is closed over the top of balls 19 except for holes 30 for the pivot balls 21. Holes 30 are drilled through the housing into the race to permit pivot balls 21 to be positioned beneath bearing pads 25 and supported by race balls 19.

The seesaw action between pivot pads and the balls therebetween as described in the aforementioned Brown and Dunn patents provides the advantages of self-alignment and self-equalization to a thrust bearing. The addition of means to restrain the balls in the race permits fewer number of pads for smaller bearings without necessitating larger balls and permits selection of the number of balls in the race between pivot balls, both required for practical utilization of the teachings of Brown and Dunn. Deviations from the particular means shown to secure the balls within the race are intended to be within the spirit of the invention as defined in the appended claims. What is claimed and desired to be secured by Letters Patent of the United States is:

I claim:
1. A self-equalizing, self-aligning thrust bearing comprising:
   a housing having a bore through the center thereof and an annular race about said bore;
   a first set of balls in said race;
   a second set of balls;
   means to retain said first set of balls in said race;
   said retaining means having holes therethrough spaced evenly thereabout to permit said second set of balls, one ball in each hole, to rest against and be supported by the balls of said first set, the space between balls of said first set being taken up by the balls of said second set; and
   bearing pads movably restrained to said housing, each of said pads being pivotally supported by one of the balls of said second set such that each pad is self-aligning about the ball pivot and self-equalizing by the translation of movement through the sets of balls.

2. A thrust bearing as recited in claim 1 wherein a plurality of balls of said first set lie between consecutive balls of said second set.

3. A thrust bearing as recited in claim 2 wherein said retaining means is the housing of the bearing.

4. A thrust bearing as recited in claim 3 wherein said retaining means is a platelike ring covering said race.

5. A thrust bearing as recited in claim 4 wherein the balls of said second set are larger than the balls of said first set whereby the balls of the second set are prevented from falling into the race during initial insertion thereof into the holes of said ring.

6. A thrust bearing as recited in claim 5 further including means to secure the ring to the housing and means to equally space the pads around the center bore and over the balls of said second set.

7. A thrust bearing as recited in claim 6 wherein said ring is secured to the housing such that the holes are annularly displaced from the center point of said pads to import tilt to the pads for clockwise rotation of the machine being supported.

8. A thrust bearing as recited in claim 7 wherein the ring imports tilt in the opposite direction to said pads for counterclockwise rotation when the ring is secured to the housing upside down.

9. A thrust bearing as recited in claim 6 wherein the ring is secured to the housing such that the holes coincide with the center point of the pads, and said means to space the pads are offset washers held adjacent the pads to offset the pivot point in a first direction for clockwise rotation of the machine being supported and a second direction for counterclockwise rotation.

10. A thrust bearing as recited in claim 2 further including means to equally space the pads around the center bore and over the balls of said second set, said means to space being adjustable to offset the pads in either direction from the pivot balls.